US012671958B1

(12) United States Patent
Chen et al.

(10) Patent No.: US 12,671,958 B1
(45) Date of Patent: Jun. 30, 2026

(54) REALISTIC ROOM ACOUSTIC SIMULATION FOR VIDEOCONFERENCING

(71) Applicant: Zoom Video Communications, Inc., San Jose, CA (US)

(72) Inventors: Yuhui Chen, San Jose, CA (US); Yifeng Fan, Foster City, CA (US); Zhaofeng Jia, Saratoga, CA (US)

(73) Assignee: Zoom Communications, Inc., San Jose, CA (US)

(*) Notice: Subject to any disclaimer, the term of this patent is extended or adjusted under 35 U.S.C. 154(b) by 341 days.

(21) Appl. No.: 18/425,875

(22) Filed: Jan. 29, 2024

(51) Int. Cl.
*H04S 7/00* (2006.01)

(52) U.S. Cl.
CPC .......... *H04S 7/305* (2013.01); *H04S 2400/13* (2013.01); *H04S 2400/15* (2013.01); *H04S 2420/01* (2013.01)

(58) Field of Classification Search
CPC .. H04S 7/305; H04S 2400/13; H04S 2400/15; H04S 2420/01
USPC .......................................................... 381/303
See application file for complete search history.

(56) References Cited

U.S. PATENT DOCUMENTS 10,616,706 B1 * 4/2020 Amengual Gari ...... H04S 7/305
2008/0232603 A1 * 9/2008 Soulodre ................ H04S 7/305
381/63

* cited by examiner

*Primary Examiner* — Paul Kim
(74) *Attorney, Agent, or Firm* — Kilpatrick Townsend & Stockton, LLP

(57) ABSTRACT

Systems and methods for synthetic audio datasets generation for videoconferencing based on realistic room acoustic simulation are provided. For example, a room-independent recording for a source audio signal and a particular type of microphones can be generated and a target room setup for a target room can be obtained. The target room setup specifying one or more of a size of the target room, respective locations of a speaker and a microphone in the target room. Room characteristics of the target room can be generated based on the target room setup via a room acoustic model. A synthetic audio signal for the target room and the particular type of microphones can be generated by applying the room acoustic characteristics onto the room-independent recording.

20 Claims, 10 Drawing Sheets

500

AFTER PERTURBATION

BEFORE PERTURBATION

REALISTIC ROOM ACOUSTIC SIMULATION FOR VIDEOCONFERENCING

FIELD

The present application generally relates to videoconferencing, and more particularly relates to synthetic audio datasets generation for videoconferencing based on realistic room acoustic simulation.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
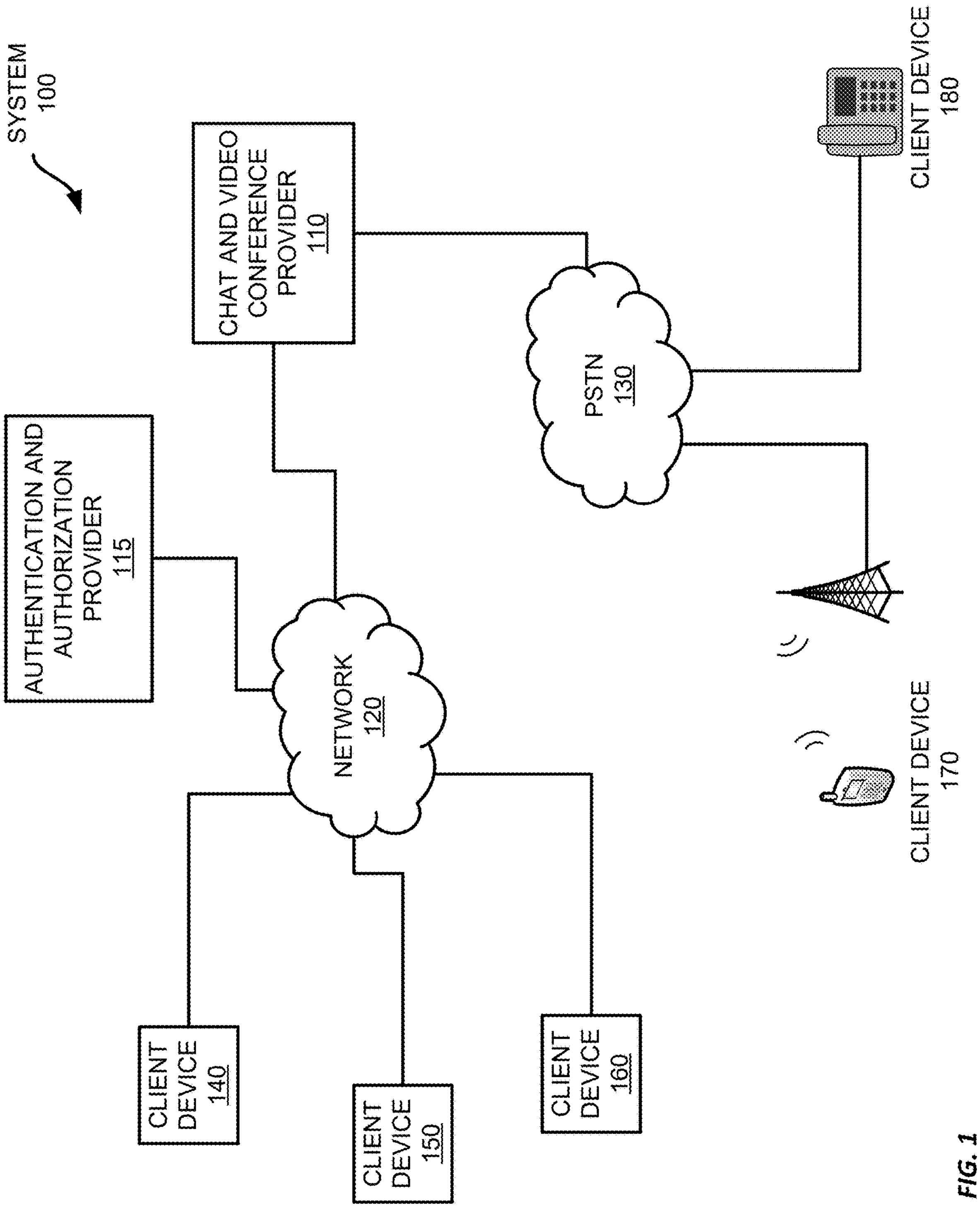
FIG. 1 shows an example system that provides videoconferencing functionality to various client devices, according to certain aspects described herein.

Examples are described herein in the context of systems and methods for synthetic audio datasets generation for videoconferencing based on realistic room acoustic simulation. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Videoconferencing has become a common way for people to meet as a group, but without being at the same physical location. Participants can be invited to a videoconference meeting, join from their personal computers or telephones, and are able to see and hear each other and converse largely as they would during an in-person group meeting or event. The advent of user-friendly videoconferencing software has enabled teams to work collaboratively despite being dispersed around the country or the world. It has also enabled families and friends to engage with each other in more meaningful ways, despite being physically distant from each other.

In the video-conferencing platform, audio signals generated during the video conference can be processed for various purposes. For example, audio signals from each participant need to be delivered to other participants in high quality. As such, audio signals captured at the client computing devices of the individual participants can be processed to, for example, remove noises, reverberations, and so on. In addition, generating transcripts for the video conference can also facilitate the participants of the conference to improve the understanding of the content of the video conference. Generating a summary of the video conference can allow users who did not attend the video conference to quickly catch up with the discussion of the meeting.

The algorithms or models used to process the audio signals, generate the transcript and summary need to be trained and tested to ensure the performance thereof. However, generating the audio datasets for training and testing usually involves recording people speaking in a room using different devices with different microphone-speaker distances. This is a time-consuming process and sometimes infeasible. For example, some users may report audio quality issues they experienced during the meetings. However, the room where the users stay when participating meetings are inaccessible, making it difficult to identify the cause of the issues and collect a large amount of audio data to improve the algorithm.

To solve the above problems, example systems and methods for synthetic audio datasets generation for videoconferencing based on realistic room acoustic simulation are provided. As described herein, an audio dataset generation system can generate synthetic audio signals for a target room based on realistic room acoustic simulation, such as by simulating a room impulse response of the target room accurately and realistically. Further, because different microphones have different acoustic characteristics (e.g., microphone impulse response) and some microphones have built-in audio processing steps, the generated synthetic audio signals also need to take the microphone into account.

In real scene recordings, the source audio signal is played back via a speaker and the sound wave of the audio signal undergoes the room acoustic system, such as reflection on the walls, before reaching the microphone, where the microphone acoustic characteristics are applied onto the captured sound waves. As a result, generating the synthetic audio signal requires estimating or simulating the room acoustic model as well as the microphone acoustic model, which can be computationally expensive. To simplify the simulation process, room-independent and microphone-dependent recordings (referred to as "room-independent recordings") can be obtained. Different room-independent recordings can be generated for different types of microphones. A room acoustic model is then applied to these room-independent recordings to generate synthetic audio datasets for different room and microphone combinations.

For example, the audio dataset generation system can generate or otherwise access a room-independent recording for a source audio signal, such as a clean human speech signal (e.g., a speech signal without or with little noise or reverberation). The room-independent recording can be obtained by a near-field recording of the source audio signal using a microphone placed in proximity of a speaker playing the source audio signal. Because the speaker and the microphone are placed close to each other, the recorded audio signal mostly comes directly from the speaker and signals undergone the room acoustic system, such as the reverberation, can be ignored. Further, the near-field recording captured by the microphone will have the acoustic characteristics of the microphone and will have gone through any internal processing by the microphone. In other examples, the room-independent recording can be obtained by applying a machine learning model trained to generate room-independent recordings for a particular type of microphones. The machine learning model is trained using audio data sets that have the acoustic characteristics and internal processing of the microphone and thus the generated room-independent recordings also have the characteristics of this particular type of microphones.

To generate synthetic audio dataset for a target room, the room setup for the target room needs to be obtained. The room setup can include information such as the size of the target room, the locations of a speaker and a microphone in the room, and so on. If the room setup of a target room is not available to the audio dataset generation system, the room setup can be estimated from an audio sample recorded in the target room, such as by using a room acoustic estimator.

According to the room setup, a room acoustic model can be applied to the room-independent recording to generate synthetic audio datasets. The room acoustic model can be based on an improved image source model (ISM). The original ISM treats each reflection of the sound wave of the audio by a wall as a direct signal from a virtual source and the virtual source is treated as a source for the next reflection. In each reflection, a noise at a certain perturbation level is usually added to mimic the effect caused by an unsmoothed wall. However, the synthetic signals generated using the ISM often have a sweeping echo effect that rarely occurs in real scenarios, and an unrealistic close distance feeling. To improve the ISM, the perturbation level of the noise added to each reflection can be controlled by the distance between the image source to the microphone or the number of reflections taken by each source, where a larger distance leads to a stronger perturbation. Further, a mask can be applied to the acoustic characteristics of the room (e.g., the room impulse response) that suppresses the early reverberation and increases the late reverberation in the acoustic characteristics of the room to make the generated synthetic audio signal sounds more distant and similar to the real recording. The above process can be repeated for room-independent recordings for different types of microphones and for different room setups of different target rooms.

The generated synthetic audio datasets can be output to an audio data processing system. The audio data processing system can train, test, or evaluate audio processing machine learning models or algorithms used in, for example, sound event detection (SED), automatic speech recognition (ASR), denoising, acoustic echo cancellation (AEC), automatic gain control (AGC), and so on.

For example, the audio data processing system can use synthetic audio datasets to train and test a denoising model. The denoising model can be deployed to individual client computing devices (including the client computing device located in the target room) to denoise the audio signals recorded at a participant's client computing devices before transmitting to other participants of the meeting. In another example, the audio data processing system can train and test an ASR model using synthetic audio datasets and deploy the model to a chat and video conference provider. The chat and video conference provider can use the model to generate transcripts or a summary of the meeting. The models or algorithms trained or tested using the synthetic audio datasets can be used in various other applications.

As described herein, certain embodiments provide improvements to audio processing, machine learning, and videoconferencing. Audio processing algorithms and machine learning models for audio signals require a large amount of training data to train the models or test the algorithms for a given room setup or different room setups in order to achieve high accuracy. However, obtaining audio datasets for different room, speaker and microphone setups is time-consuming. The technologies presented herein solve the problem by applying an improved room acoustic model that reduces unrealistic artifacts in the generated audio signal onto room-independent recordings. Because the room-independent recordings have incorporated the acoustic characteristics of the microphone, the generated audio signal is similar to the real recordings. As a result, a large amount of training data can be generated with significantly less time and computations and of high accuracy. This leads to the high accuracy and high efficiency of training or testing machine learning models or algorithms for audio signal processing. Consequently, videoconferencing can be improved by providing high-quality audio signal and accurate transcripts and meeting summary.

This illustrative example is given to introduce the reader to the general subject matter discussed herein and the disclosure is not limited to this example. The following sections describe various additional non-limiting examples and examples of systems and methods for active speaker detection for videoconferencing.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
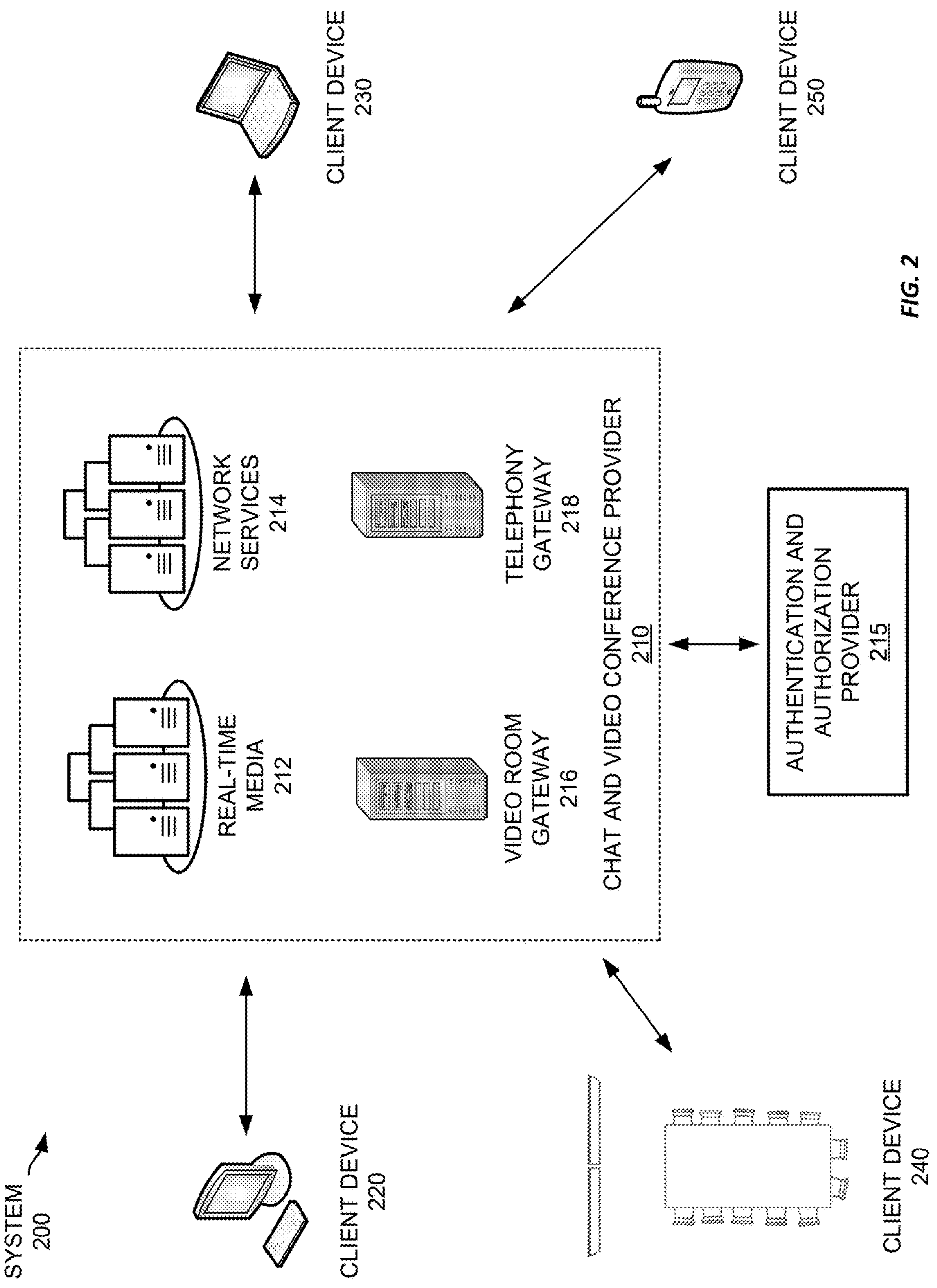
FIG. 2 shows an example system in which a chat and video conference provider provides videoconferencing functionality to various client devices, according to certain aspects described herein.

Chat and video conference provider 110 allows clients to create videoconference meetings (or "meetings") and invite others to participate in those meetings as well as perform other related functionality, such as recording the meetings, generating speech transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employ a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example, encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryptions may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory, and network I/O as well as network parameters such as packet loss, latency, and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples, additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information, etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some examples according to the present disclosure, a user may select an option to use one or more optional AI features available from the virtual conference provider. The use of these optional AI features may involve providing the user's personal information to the AI models underlying the AI features. The personal information may include the user's contacts, calendar, communication histories, video or audio streams, recordings of the video or audio streams, transcripts of audio or video conferences, or any other personal information available the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to provide training data for the underlying AI models, the user may be provided with an option to consent, or deny consent, to access and use some or all of the user's personal information. In general, the goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default—account owners and administrators control whether to enable these AI features for their accounts, and if enabled, individual users may determine whether to provide consent to use their personal information.

Figure 3:
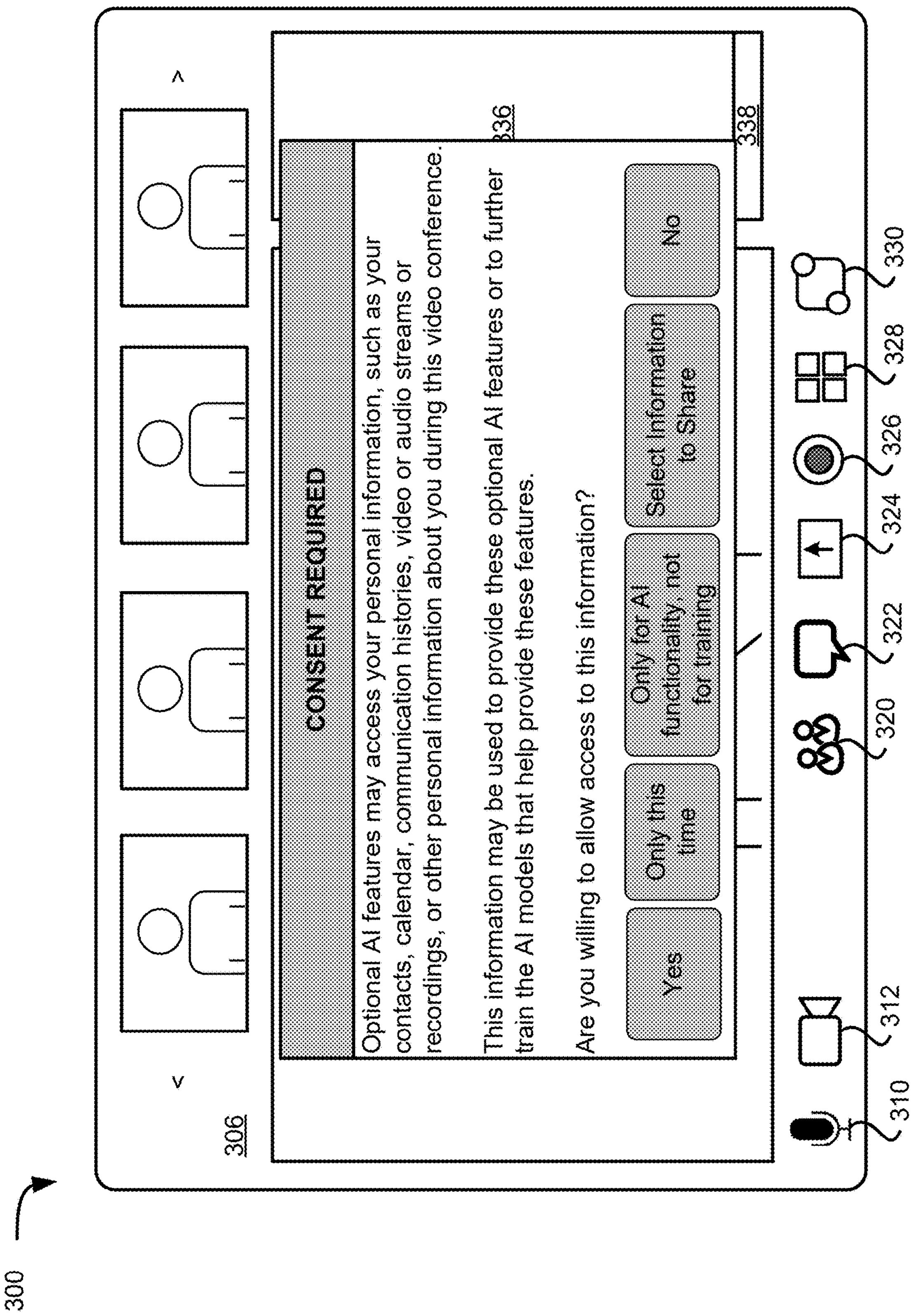
FIG. 3 shows an example of a user interface configured to display a consent authorization window for a user who has engaged in a video conference to interact with and to select options to use an available optional AI feature, according to certain aspects of the present disclosure.

As can be seen in FIG. 3, a user has engaged in a video conference and has selected an option to use an available optional AI feature. In response, the GUI has displayed a consent authorization window for the user to interact with. The consent authorization window informs the user that their request may involve the optional AI feature accessing multiple different types of information, which may be personal to the user. The user can then decide whether to grant permission or not to the optional AI feature generally, or only in a limited capacity. For example, the user may select an option to only allow the AI functionality to use the personal information to provide the AI functionality, but not for training of the underlying AI models. In addition, the user is presented with the option to select which types of information may be shared and for what purpose, such as to provide the AI functionality or to allow use for training underlying AI models.

Figure 4:
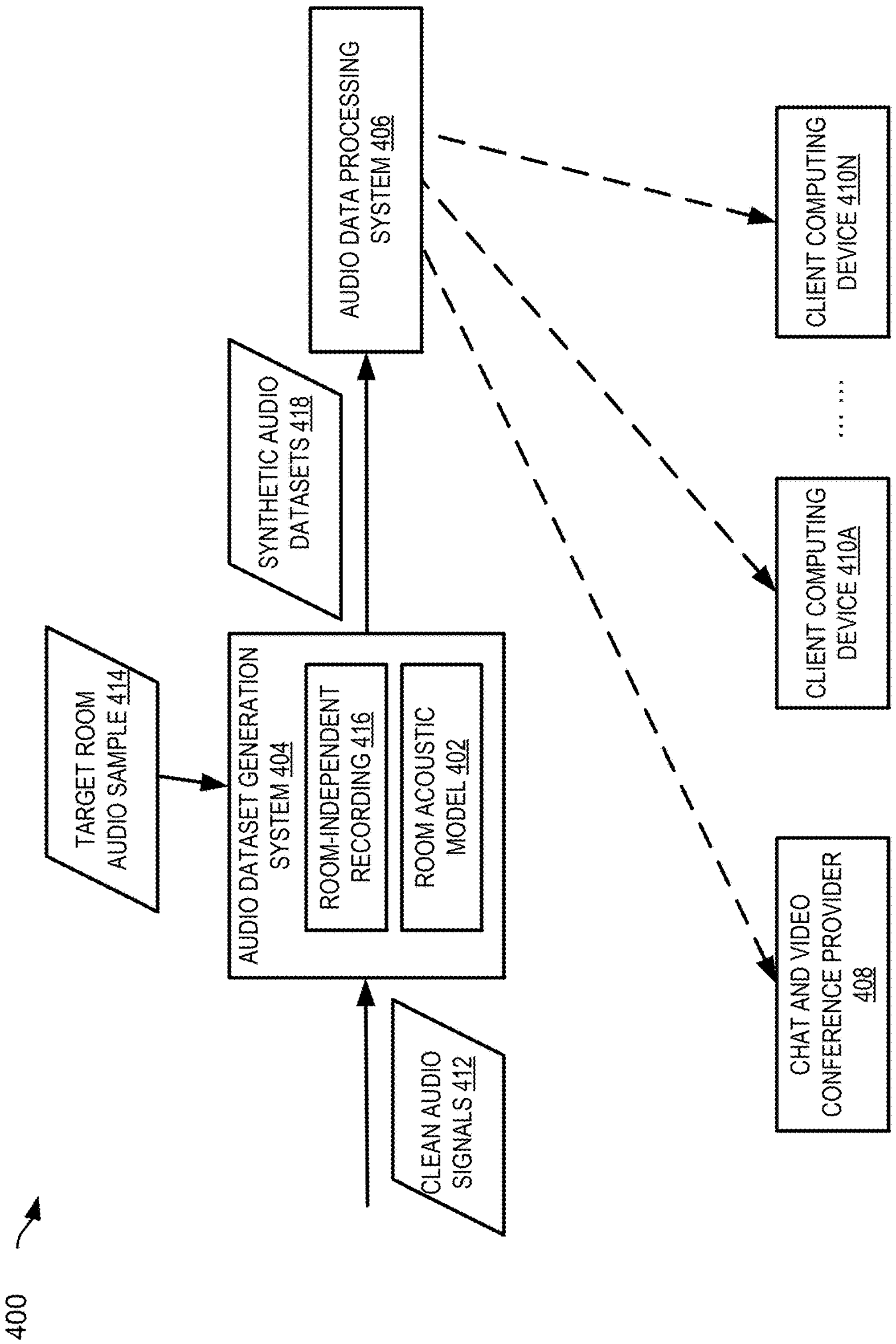
FIG. 4 shows an example of an operating environment for audio dataset generation for videoconferencing based on realistic room acoustic simulation, according to certain aspects of the present disclosure.

Referring now to FIG. 4, FIG. 4 shows an example of an operating environment 400 for audio dataset generation for videoconferencing, according to certain aspects described herein. The operating environment 400 includes an audio dataset generation system 404 configured to generate synthetic audio datasets 418 from clean audio signals. In some examples, the audio dataset generation system 404 generates or otherwise obtains a room-independent recording 416 for each given type of microphone. The room-independent recording 416 has the acoustic characteristics of the type of microphone but not the room acoustic characteristics of a room. The audio dataset generation system 404 applies a room acoustic model 402 to the room-independent recording 416 to generate synthetic audio datasets 418. For example, for a given room setup, the room acoustic model 402 generates the room acoustic characteristics, such as the room impulse response ("RIR") with reduced artifacts. The room acoustic characteristics can be applied to the room-independent recording 416 to generate synthetic audio datasets 418 for the target room and the type of microphone used to generate the room-independent recording 416. In some examples, the room setup used by the room acoustic model 402 can be pre-specified if the target room setup is known or be estimated from an audio sample recorded in the target room if unknown. This audio sample is also referred to herein as a target room audio sample 414. The estimation may be performed using, for example, room acoustic estimator such as room impulse response (RIR) estimation, RT60 estimation, etc. Additional details regarding the audio dataset generation system 404 will be described later with respect to FIGS. 5-8.

The operating environment 400 further includes an audio data processing system 406. The audio data processing system 406 can be a system configured to train, test, or evaluate audio processing machine learning models or algorithms used in, for example, sound event detection (SED), automatic speech recognition (ASR), denoising, acoustic echo cancellation (AEC), automatic gain control (AGC), and so on. For example, the audio data processing system 406 can use the synthetic audio datasets 418 to train and test a denoising model. The denoising model can be deployed to individual client computing devices 410A-410N (such as the client computing devices 140-170 in FIG. 1 and the client devices 220-250 in FIG. 2) to denoise the audio signals recorded at a participant's client computing devices before transmitting to other participants of the meeting. In another example, the audio data processing system 406 can train and test an ASR model using the synthetic audio datasets 418 and deploy the model to a chat and video conference provider 408 (such as the chat and video conference provider 110 and 210 in FIGS. 1 and 2, respectively). The chat and video conference provider 408 can use the model to generate transcripts or a summary of the meeting. The models or algorithms trained or tested using the synthetic audio datasets can be used in various other applications.

Figure 5:
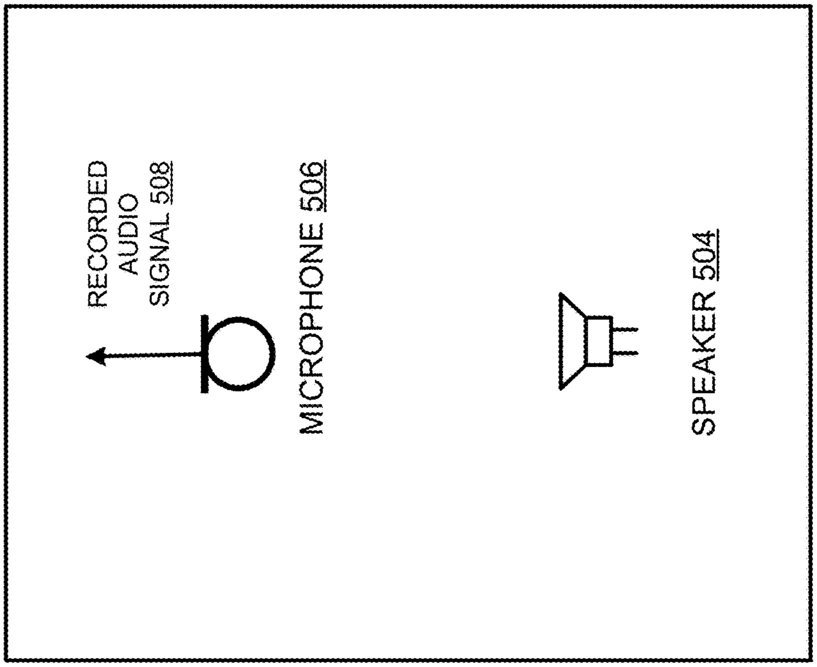
FIG. 5 shows a diagram illustrating an example of a simulated meeting room used for synthetic audio dataset recording, according to certain aspects of the present disclosure.

Referring now to FIG. 5, FIG. 5 shows an example of a simulated meeting room 500 for which the synthetic audio datasets are generated, according to certain aspects of the present disclosure. There is a pair of a speaker 504 and a microphone 506 in the room. The room setup for room 500 can specify the size of the room, including the length and width of the room, the materials of walls, ceiling and floor with different sound absorption ability, the locations of the speaker 504 and the microphone 506 in the room, and so on. In real recording, a physical speaker 504 and a physical microphone 506 would be placed in a room having the same size as room 500 at the locations specified by the room setup. The speaker 504 would be the source of the audio signal and used to play the clean audio signal 412. The microphone 506 would record the audio signal and generate recorded audio signal 508. Instead of actually recording the audio signal in such a room, synthetic audio datasets generation based on realistic room acoustic simulation can be employed to simulate this recording process.

For example, given a room setup, such as that shown in FIG. 5, let $S_{speaker}$ denote the source signal uttered by the speaker and $S_{mic}$ be the signal captured by the microphone (and then input to applications such as a videoconferencing client), their relationship can be described as follows:

$$S_{mic}=(S_{speaker}\otimes RIR)\otimes MIR\otimes MAP \tag{1}$$

Here, the symbol $\otimes$ represents the convolution operator, RIR stands for the room impulse response which represents the acoustic characteristics of the room (e.g., how the sound is propagated from the speaker to the microphone). $S_{speaker}\otimes$ RIR stands for the signal at the location of the microphone without any processing. However, due to the microphone's own acoustic characteristics, the signal received by the microphone would be affected by the microphone's own impulse response, denoted by MIR, as well as the microphone's built-in audio processing steps, such as automatic gain control (AGC) and noise suppression (NS), denoted by MAP. As such, $S_{mic}$ includes all the effects of the room acoustic characteristics (RIR) and the microphone acoustic characteristics (MIR and MAP). Note that the assumption is the microphone audio processing is linear and time-invariant (LTI) such that it can be characterized by a convolution with MAP.

Given the above, in order to simulate the microphone signal $S_{mic}$ from the source signal $S_{speaker}$, the RIR based on the room setup needs to be determined. In addition, the effects brought by the microphone acoustic characteristics (e.g., MIR and MAP) need to be simulated. The microphone acoustic characteristics depend on the microphone type, and microphones of the same type generally have the same or similar acoustic characteristics. As such, simulating $S_{mic}$ includes two major steps: the simulation of MIR and MAP and the determination of RIR.

However, simulating the acoustic characteristics of both the room and the microphone can be complicated and inaccurate. To simplify the problem and thus to reduce the computational complexity and increase the accuracy, Eqn. (1) can be rearranged by switching the order of (MIR $\otimes$ MAP) and RIR such that $$\begin{aligned} S_{mic} &= (S_{speaker}\otimes RIR)\otimes MIR\otimes MAP \\ &= (S_{speaker}\otimes MIR\otimes MAP)\otimes RIR \end{aligned} \tag{2}$$

without altering the resulting microphone signal $S_{mic}$. In this way, $S_{mic}$ can be simulated by first passing the source signal $S_{speaker}$ through the acoustic characteristics of the microphone (i.e., MIR $\otimes$ MAP), then apply the acoustic characteristics of the speaker (i.e., RIR). In particular, $S_{speaker} \otimes$ MIR $\otimes$ MAP can be viewed as the source signal affected by the microphone acoustic characteristics, without any room acoustic modeling involved. As such, $S_{speaker} \otimes$ MIR $\otimes$ MAP is a room-independent recording. Therefore, if $S_{speaker} \otimes$ MIR $\otimes$ MAP can be obtained efficiently, synthetic audio signals under different room setups may be obtained by applying different RIRs.

One way to efficiently obtain the signal $S_{speaker} \otimes$ MIR $\otimes$ MAP is through near field recording. Ideally, $S_{speaker} \otimes$ MIR $\otimes$ MAP can be obtained by recording the source signal by a specific microphone in an anechoic room. If such conditions cannot be met, a near-field recording of the source signal in a small room with low reverberation may be obtained. For example, the microphone can be placed in the proximity of the speaker, such as within 0.5 meter. Then, the resulting recording can be approximately treated as $S_{speaker} \otimes$ MIR $\otimes$ MAP, because the near-field recording is mostly composed by the direct signal and thus the reverberation could be ignored.

In an alternative or additional example, a machine learning model can be used to generate the signal $S_{speaker} \otimes$ MIR $\otimes$ MAP. For example, near-field recordings for a specific microphone can be obtained and used to train a generative model (e.g. Generative adversarial net (GAN) or diffusion models) to generate a recording generator. The near-field recording generator accepts clean speech as input and directly outputs the simulated near-field recording. As a result, the generator will learn the microphone acoustic characteristics and can generate any near-field recording by only providing the corresponding clean speech with high fidelity.

It should be understood that the recording generator is not restricted to near-field recordings. For example, the recording generator can be trained with recordings in a low-reverberation environment at various microphone-speaker distances. As a result of the training, the recording generator can output simulated room-independent recordings at a given distance. The distance can be provided as input to the model or otherwise signaled to the recording generator. This general recording generator can be useful in scenarios where the microphone acoustic characteristics change as the microphone-speaker distance changes. In these scenarios, near-field recordings do not accurately capture the acoustic characteristics of the microphone at a far distance, leading to the simulated synthetic datasets to be inaccurate. In this way, the general recording generator can be used to generate the simulated room-independent recordings for the corresponding microphone-speaker distance.

Figure 6A:
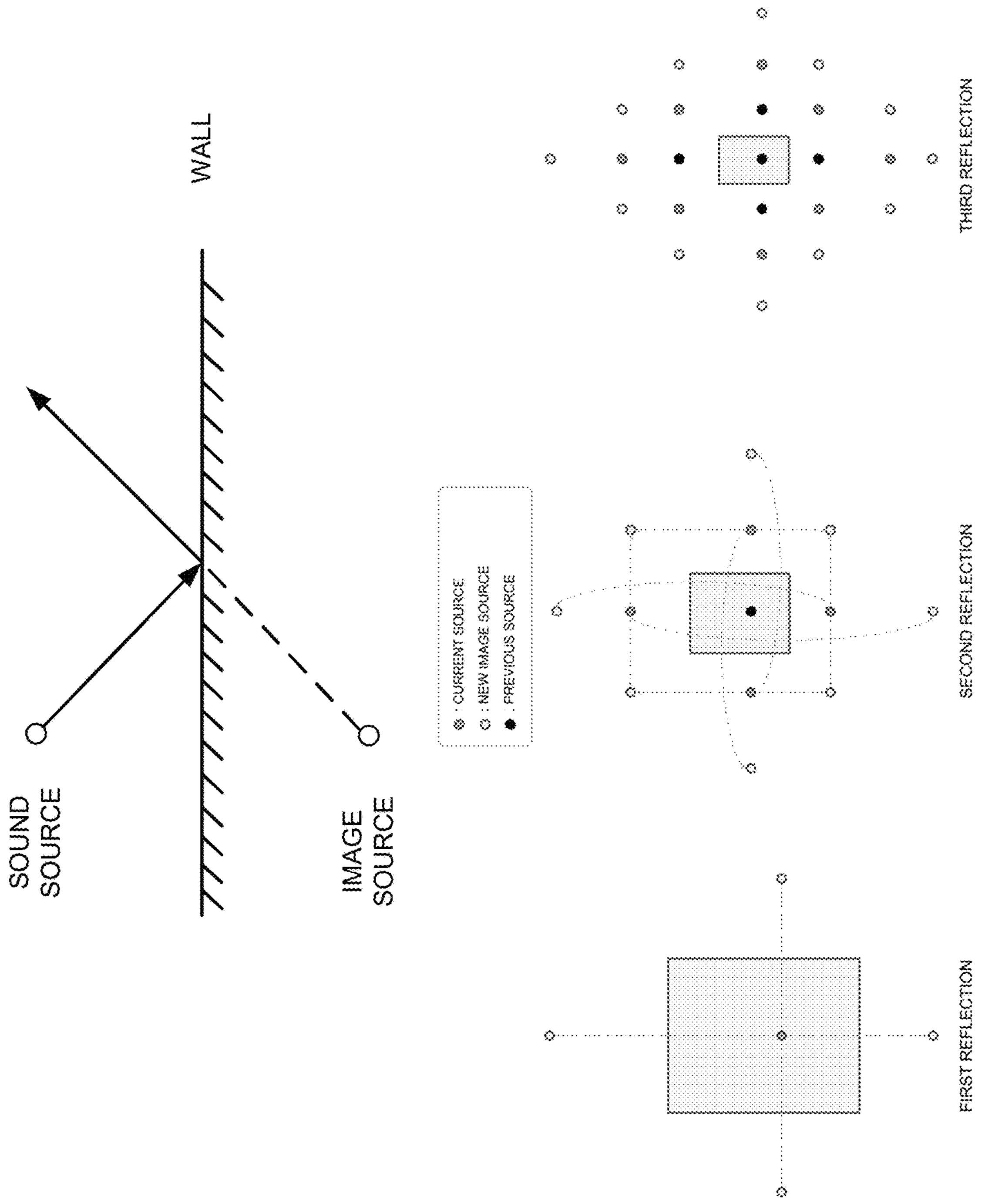
FIG. 6A shows a diagram illustrating the reflections in the image source model, according to certain aspects of the present disclosure.
Figure 6B:
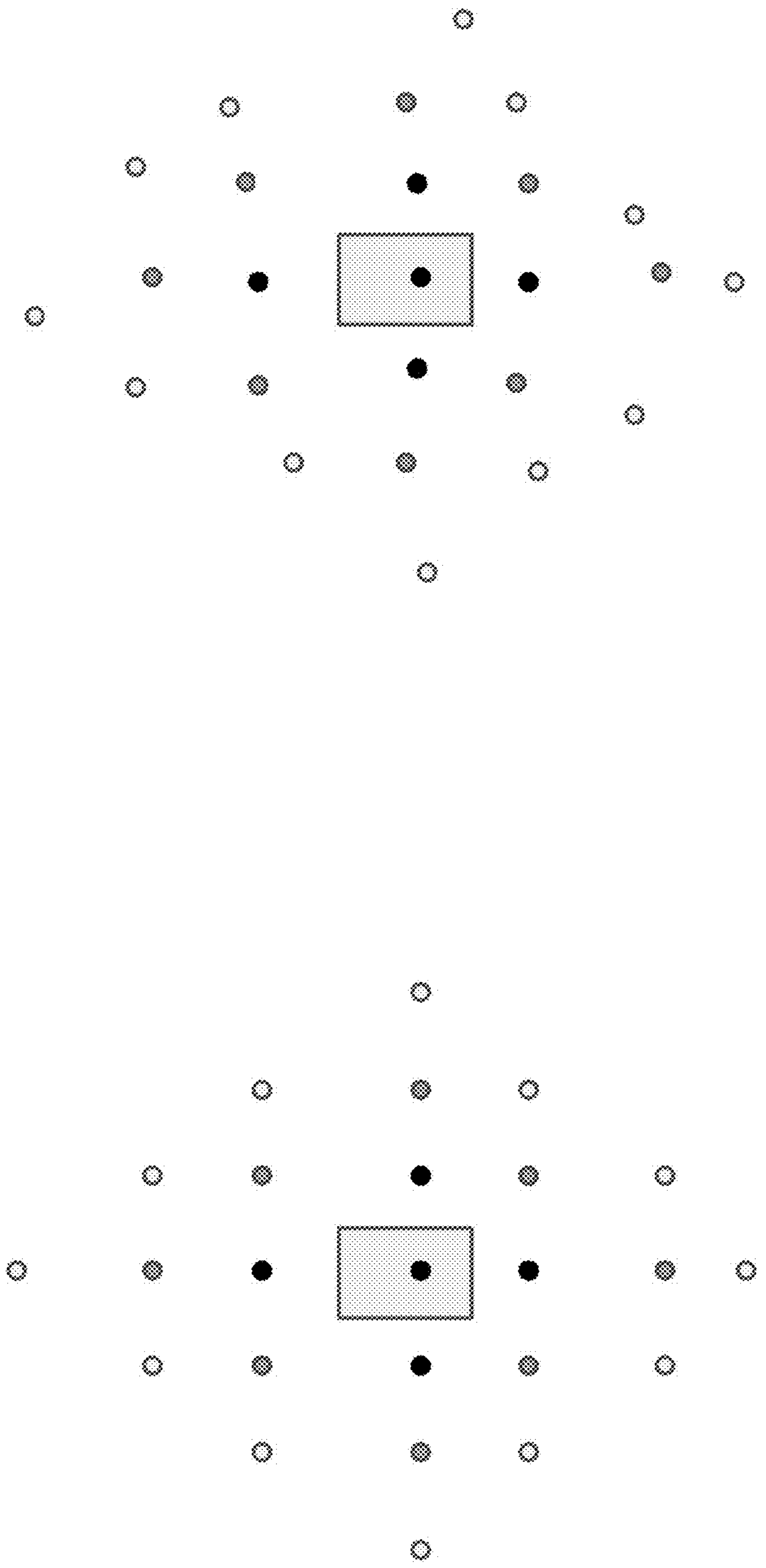
FIG. 6B shows a diagram illustrating image sources before and after the perturbations, according to certain aspects of the present disclosure.

To simulate the room acoustic characteristics RIR, a room acoustic model based on the image source model (ISM) can be utilized. In ISM, each wall of the room is treated as a perfect mirror, and thus each sound wave reflected at a wall can be treated as a wave that is directly transmitted from an image source as shown in the top figure of FIG. 6A. As a result, each reflection of the sound on a wall will "generate" a new source, and by iterating this process the propagation of the sound wave in a room can be simulated. To be concrete, the bottom figures of FIG. 6A show the image sources generated after different numbers of reflections. At the beginning, the sound wave uttered from the speaker will be reflected at each wall (assuming there are four walls in total) and thus four image sources are generated after the first reflection as shown in the left bottom plot of FIG. 6A. To simulate the transmission (reflection) of the sound waves afterwards, the previous four image sources are treated as four individual speakers, and new image sources are generated based on them, to simulate the effect of the second reflection as shown in the middle bottom plot of FIG. 6A. Similarly, for the third reflection, new images are added based on the ones generated from the second reflection. This process iterates until a sufficient number of reflections is achieved. In this way, the room impulse response can be formulated as a summation of the impulses transmitted directly from the source and each image source to the microphone, without any reflections, given as follows:

$$a_r(s_0, n) = \sum_{s\in v_r(s_0)} \frac{(1-\alpha)^{gen(s)}}{4\pi\|r-s\|}\delta_{LP}\left(n - F_s\frac{\|r-s\|}{c}\right) \quad (3)$$

Here, r and s represent the locations of the speaker and the (image) source, respectively, as vectors. a denotes the absorption coefficient such that at each reflection, the amplitude of the sound wave is decreased by multiplying (1−a), and gen(s) represents the number of reflections.

However, the room impulse response generated by the ISM model described above may have an undesired "sweeping echo" effect which is an unrealistic phenomenon often observed in simulation. Such an effect is caused by the assumption that each wall is treated as a perfect mirror and sound waves always reflect specularly. To reduce this effect, each image source location can be randomly perturbed. The perturbation level can also be controlled by the distance between the image source and the microphone, where a larger distance leads to a stronger perturbation. For example, let s and s' be the location of an image source before and after adding the perturbation, respectively. s and s' have the following relationship:

$$s'=s+\delta\times N_R \quad (4)$$

where δ is a random variable that is drawn from a uniform distribution Uniform (−x, x) with x being the boundary and $N_R$ is the number of reflections. Such an added perturbation is reasonable as each wall in the real world would not be a perfect mirror. Also, the perturbation level increases as the number of reflections grows, as in real world more perturbation would be introduced as more reflections happened. For example, in FIG. 6B, the image sources before and after the perturbations are shown, where a stronger perturbation is added to those images generated from a higher number of reflections. As a result, by adding such perturbation with increasing levels, the resulting RIR sounds more realistic than the RIR without the perturbation.

Another observation is that under the same room setup, the simulated signal always sounds "closer" than the real recording. This is related to the ratio of early and late reverberation and the early-late reverberation ratio of the simulated RIR is higher than the real one. To mitigate this problem, a mask can be applied to simulated RIR to adjust the ratio, given as follows:

$$\text{mask}=1-a\times\exp(-b\times t). \quad (5)$$

Figure 7:
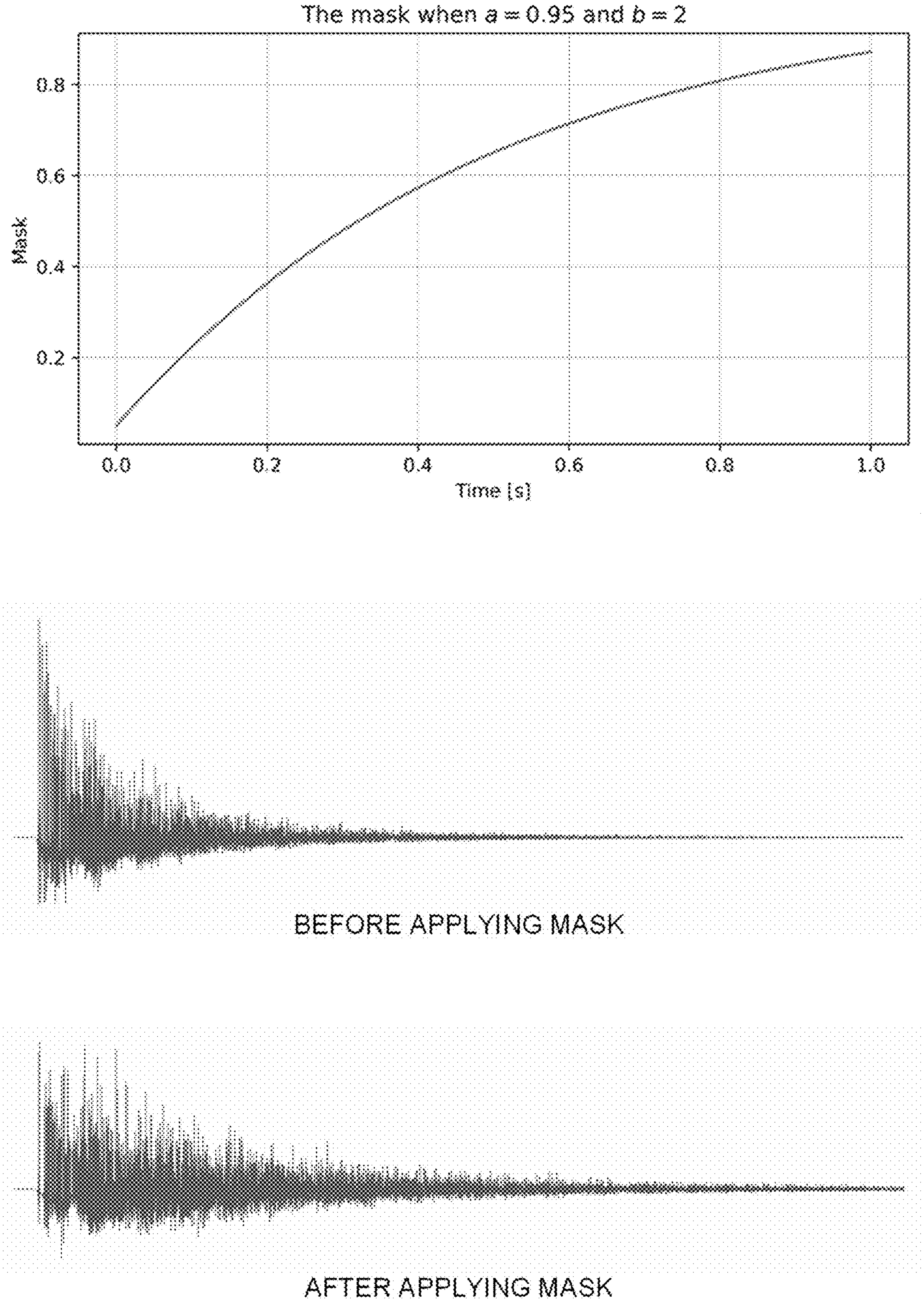
FIG. 7 shows a diagram illustrating an example of a mask applied to acoustic characteristics of a room and the simulated room impulse response before and after applying the mask, according to certain aspects of the present disclosure.

The mask involves two parameters: a and b. To address the above artifact, the mask should be configured to reduce the amplitude of the early part of the RIR, while preserving the late part. As a result, the simulation generated by the adjusted RIR sounds more distant and similar to the real recording. FIG. 7 shows an example of the mask and the simulated RIR before and after applying the mask.

Another issue of existing simulation approaches is the lack of an evaluation process that assesses how close the simulation is to the target recording. To address this issue, several objective evaluation methods can be utilized. For example, RT60 reverberation time estimation can be used where a reverberation time estimator can be applied to determine if the simulated and recorded audio signal have a similar reverberation level. In another example, audio quality score measuring the quality of the audio can be used, such as perceptual objective listening quality analysis (POLQA), perceptual evaluation of speech quality (PESQ), and deep noise suppression mean opinion score (DNSMOS). Ideally, the simulated and recorded audio signal should have similar scores. In a further example, audio projects improvement may be used to measure the audio quality. If a machine learning model is trained for audio tasks like automatic speech recognition or speech enhancement, the effectiveness of the simulated synthetic audio datasets can be verified by adding such synthetic audio datasets into the training set of the model. If the model performance is improved, the synthetic audio datasets can be determined to have a high quality or high accuracy. The evaluation methods discussed above can be used individually or in any combination.

Figure 8:
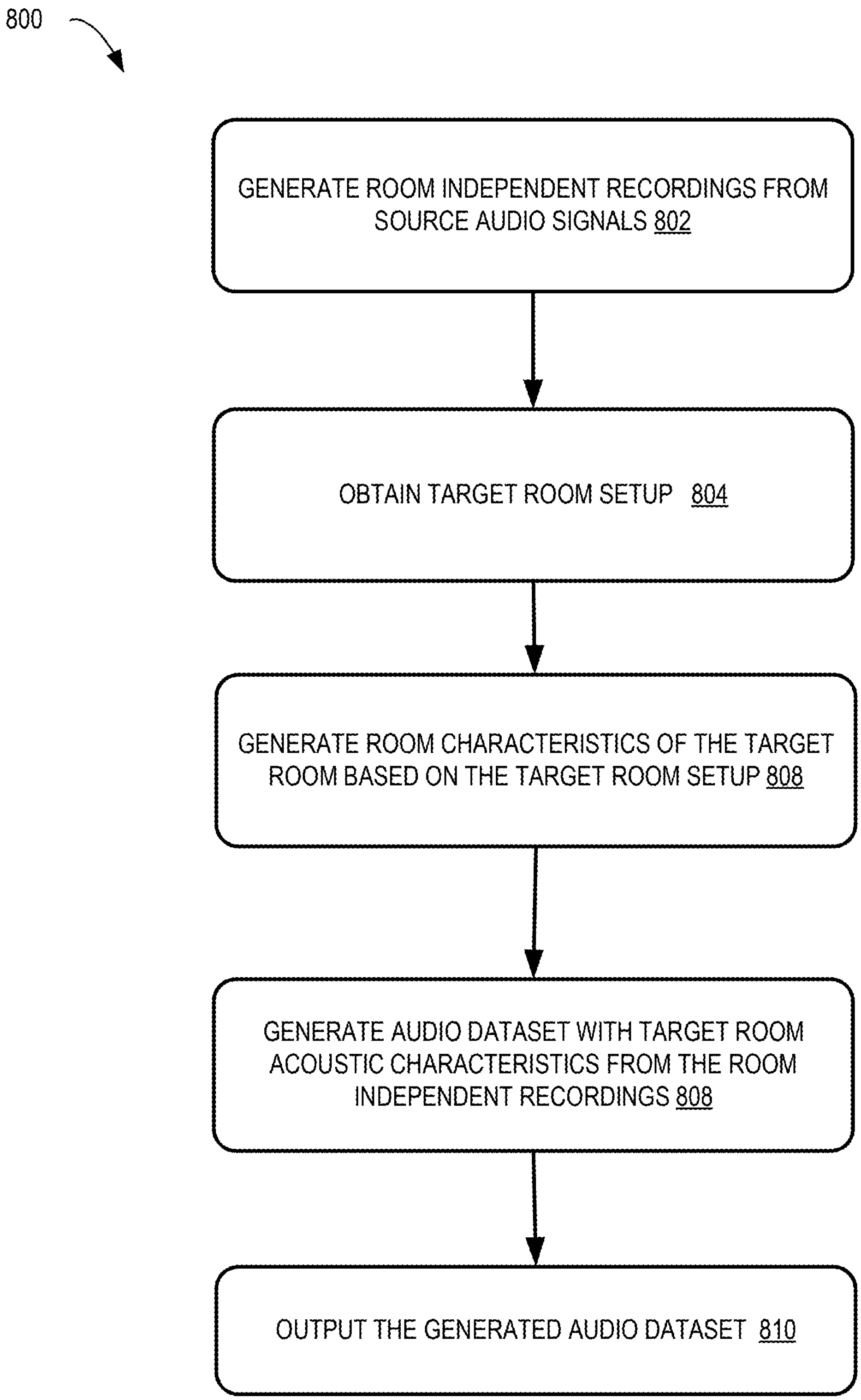
FIG. 8 shows a flowchart depicting a process for generating synthetic audio datasets based on realistic room acoustic simulation, according to certain aspects of the present disclosure.

FIG. 8 shows a flowchart depicting a process 800 for generating synthetic audio datasets based on realistic room acoustic simulation, according to certain aspects of the present disclosure. The audio dataset generation system 404 can be configured to implement operations depicted in FIG. 8 by executing suitable program code. The software or program code may be stored on a non-transitory storage medium (e.g., on a memory device). The process depicted in FIG. 8 and described below is intended to be illustrative and non-limiting. Although FIG. 8 depicts the various processing blocks occurring in a particular sequence or order, this is not intended to be limiting. In certain alternative embodiments, the blocks may be performed in some different order, or some blocks may also be performed in parallel. For illustrative purposes, the process 800 is described with reference to certain examples depicted in the figures. Other implementations, however, are possible.

At block 810, the process 800 involves generating or otherwise accessing a room-independent recording for a source audio signal. As discussed above, the room-independent recording may be obtained via a near-field recording of the source audio signal using a microphone placed in proximity of a speaker playing the source audio signal. Because the speaker and the microphone are placed close to each other, the recorded audio signal mostly comes directly from the speaker and signals undergone the room acoustic system, such as the reverberation, can be ignored. Further, the near-field recording captured by the microphone will have the acoustic characteristics of the microphone and have gone through any internal processing by the microphone. In other examples, the room-independent recording can be generated by applying a machine learning model trained to generate room-independent recordings for a particular type of microphones. The machine learning model is trained using audio data sets that have the acoustic characteristics and internal processing of the microphone and thus the generated room-independent recordings also have the characteristics of this particular type of microphones.

At block 804, the process 800 involves obtaining a target room setup for a target room. The room setup can include information such as the size of the target room, the locations of a speaker and a microphone in the room, and so on. If the room setup of a target room is not available to the audio dataset generation system, the room setup can be estimated from an audio sample recorded in the target room, such as by using a room acoustic estimator.

At block 806, the process 800 involves generating room characteristics of the target room, such as the room impulse response (RIR), based on the target room setup by using a room acoustic model. As discussed above in detail, the room acoustic model can be based on an improved ISM which treats each reflection of the sound wave of the audio by a wall as a direct signal from a virtual source and the virtual source is treated as a source for the next reflection. In each reflection, a noise at a certain perturbation level is added and the perturbation level of the noise added to each reflection can be controlled by the distance between the image source to the microphone. In some examples, a larger distance leads to a stronger perturbation. Further, a mask can be applied to the acoustic characteristics of the room (e.g., the room impulse response) that suppresses the early reverberation and increases the late reverberation in the acoustic characteristics of the room to make the generated synthetic audio signal sounds more distant and similar to the real recording.

At block 808, the process 800 involves generating a synthetic audio signal for the target room and the particular type of microphones by applying the room acoustic characteristics onto the room-independent recording. In some examples, applying the room acoustic characteristics to the room-independent recording involves convoluting the room-independent recording with the room acoustic characteristics. At block 810, the process 800 involves outputting the generated synthetic audio signal for various applications as discussed above in detail.

Figure 9:
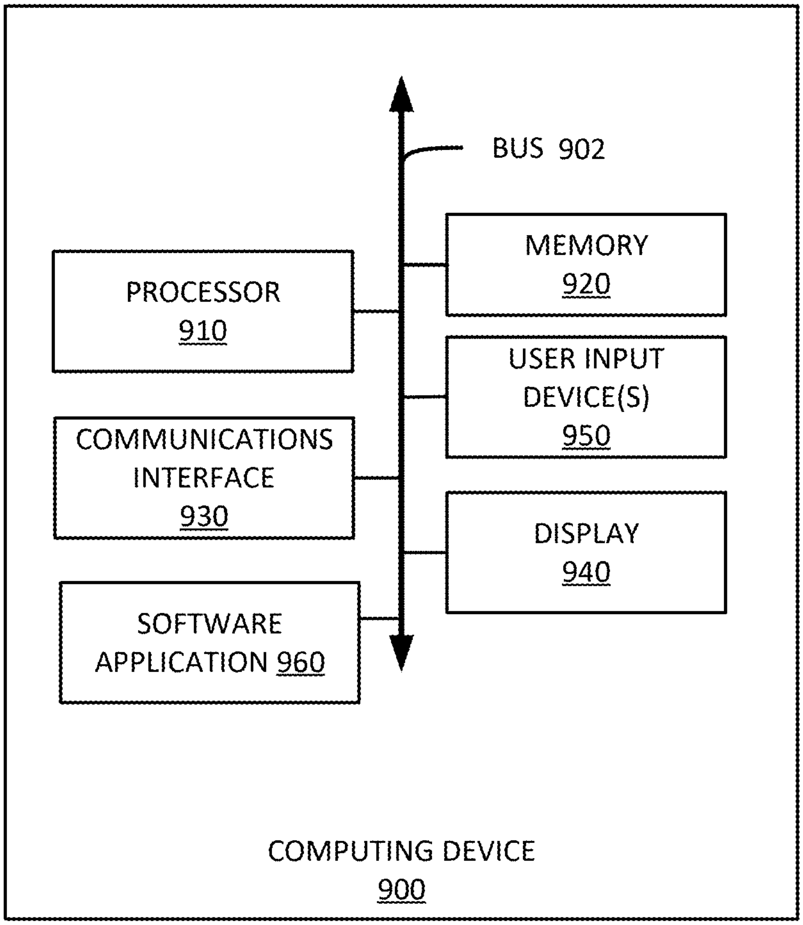
FIG. 9 shows an example computing device suitable for performing certain aspects of the present disclosure.

Referring now to FIG. 9, FIG. 9 shows an example computing device 900 suitable for performing certain aspects of the present disclosure. The example computing device 900 includes a processor 910 which is in communication with the memory 920 and other components of the computing device 900 using one or more communications buses 902. The processor 910 is configured to execute processor-executable instructions stored in the memory 920 to perform one or more processes described herein, such as part or all of the example process 800 described above with respect to FIG. 8. For example, the software application 960 provided on the computing device 900 may provide instructions for performing one or more steps of the process 800. The computing device, in this example, also includes one or more user input devices 950, such as a keyboard, mouse, touchscreen, video input device (e.g., one or more cameras), microphone, etc., to accept user input. The computing device 900 also includes a display 940 to provide visual output to a user.

The computing device 900 also includes a communications interface 930. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., “Examples 1-4” is to be understood as “Examples 1, 2, 3, or 4”).

Example #1: A method for generating a synthetic audio signal for a target room, the method comprising: generating a room-independent recording for a source audio signal and a particular type of microphones; obtaining a target room setup for a target room, the target room setup specifying one or more of a size of the target room, respective locations of a speaker and a microphone in the target room; generating, via a room acoustic model, room acoustic characteristics of the target room based on the target room setup; and generating a synthetic audio signal for the target room and the particular type of microphones by applying the room acoustic characteristics onto the room-independent recording.

Example #2: The method of Example #1, wherein generating the room-independent recording comprises obtaining a near-field recording of the source audio signal using a microphone of the particular type placed in proximity of a speaker playing the source audio signal.

Example #3: The method of Examples #1-2, wherein generating the room-independent recording comprises providing the source audio signal and a microphone-speaker distance to a machine learning mode, the machine learning model being trained to generate room-independent recordings for the particular type of microphones at a given distance.

Example #4: The method of Examples #1-3, wherein the target room setup is estimated from a target room audio sample recorded in the target room.

Example #5: The method of Examples #1-4, wherein the room acoustic characteristics of the target room comprise a room impulse response (RIR).

Example #6: The method of Examples #1-5, wherein the room acoustic model comprises an improved image source model and wherein a perturbation level of noise added to each reflection of the improved image source model increases as a number of reflections increases.

Example #7: The method of Examples #1-6, wherein the room acoustic model comprises an improved image source model and wherein the RIR is adjusted using a mask reducing an amplitude of an early reverberation of the RIR and preserving a late reverberation of the RIR.

Example #8: The method of Examples #1-7, wherein generating the synthetic audio signal comprises convolving the room-independent recording with the room acoustic characteristics.

Example #9: The method of Examples #1-8, further comprising causing the synthetic audio signal to be used as training data or testing data for an audio processing model.

Example #10: The method of Examples #1-9, wherein the source audio signal comprises human speeches.

Example #11: A system comprising: a non-transitory computer-readable medium; and a processor communicatively coupled to the non-transitory computer-readable medium, the processor configured to execute processor-executable instructions stored in the non-transitory computer-readable medium to: generate a room-independent recording for a source audio signal and a particular type of microphones; obtain a target room setup for a target room, the target room setup specifying one or more of a size of the target room, respective locations of a speaker and a microphone in the target room; generate, via a room acoustic model, room acoustic characteristics of the target room based on the target room setup; and generate a synthetic audio signal for the target room and the particular type of microphones by applying the room acoustic characteristics onto the room-independent recording.

Example #12: The system of Example #11, wherein generating the room-independent recording comprises obtaining a near-field recording of the source audio signal using a microphone of the particular type placed in proximity of a speaker playing the source audio signal.

Example #13: The system of Examples #11-12, wherein generating the room-independent recording comprises providing the source audio signal and a microphone-speaker distance to a machine learning mode, the machine learning model being trained to generate room-independent recordings for the particular type of microphones at a given distance.

Example #14: The system of Examples #11-13, wherein the room acoustic characteristics of the target room comprise a room impulse response (RIR), and wherein the room acoustic model comprises an improved image source model and wherein a perturbation level of noise added to each reflection of the improved image source model increases as a number of reflections increases and the RIR is adjusted using a mask reducing an amplitude of an early reverberation of the RIR and preserving a late reverberation of the RIR.

Example #15: The system of Examples #11-14, wherein generating the synthetic audio signal comprises convolving the room-independent recording with the room acoustic characteristics.

Example #16: A non-transitory computer-readable medium comprising processor-executable instructions configured to cause one or more processors to: generate a room-independent recording for a source audio signal and a particular type of microphones; obtain a target room setup for a target room, the target room setup specifying one or more of a size of the target room, respective locations of a speaker and a microphone in the target room; generate, via a room acoustic model, room acoustic characteristics of the target room based on the target room setup; and generate a synthetic audio signal for the target room and the particular type of microphones by applying the room acoustic characteristics onto the room-independent recording.

Example #17: The non-transitory computer-readable medium of Example #16, wherein generating the room-independent recording comprises obtaining a near-field recording of the source audio signal using a microphone of the particular type placed in proximity of a speaker playing the source audio signal.

Example #18: The non-transitory computer-readable medium of Examples #16-17, wherein generating the room-independent recording comprises providing the source audio signal and a microphone-speaker distance to a machine learning mode, the machine learning model being trained to generate room-independent recordings for the particular type of microphones at a given distance.

Example #19: The non-transitory computer-readable medium of Examples #16-18, wherein the room acoustic characteristics of the target room comprise a room impulse response (RIR), and wherein the room acoustic model comprises an improved image source model and wherein a perturbation level of noise added to each reflection of the improved image source model increases as a number of reflections increases and the RIR is adjusted using a mask reducing an amplitude of an early reverberation of the RIR and preserving a late reverberation of the RIR.

Example #20: The non-transitory computer-readable medium of Examples #16-19, wherein generating the synthetic audio signal comprises convolving the room-independent recording with the room acoustic characteristics.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A method for generating a synthetic audio signal for a target room, the method comprising:

generating a room-independent recording for a source audio signal and a particular type of microphones;

obtaining a target room setup for a target room, the target room setup specifying one or more of a size of the target room, respective locations of a speaker and a microphone in the target room;

generating, via a room acoustic model, room acoustic characteristics of the target room based on the target room setup; and generating a synthetic audio signal for the target room and the particular type of microphones by applying the room acoustic characteristics onto the room-independent recording.

2. The method of claim 1, wherein generating the room-independent recording comprises obtaining a near-field recording of the source audio signal using a microphone of the particular type placed in proximity of a speaker playing the source audio signal.

3. The method of claim 1, wherein generating the room-independent recording comprises providing the source audio signal and a microphone-speaker distance to a machine learning mode, the machine learning model being trained to generate room-independent recordings for the particular type of microphones at a given distance.

4. The method of claim 1, wherein the target room setup is estimated from a target room audio sample recorded in the target room.

5. The method of claim 1, wherein the room acoustic characteristics of the target room comprise a room impulse response (RIR).

6. The method of claim 5, wherein the room acoustic model comprises an improved image source model and wherein a perturbation level of noise added to each reflection of the improved image source model increases as a number of reflections increases.

7. The method of claim 5, wherein the room acoustic model comprises an improved image source model and wherein the RIR is adjusted using a mask reducing an amplitude of an early reverberation of the RIR and preserving a late reverberation of the RIR.

8. The method of claim 5, wherein generating the synthetic audio signal comprises convolving the room-independent recording with the room acoustic characteristics.

9. The method of claim 1, further comprising causing the synthetic audio signal to be used as training data or testing data for an audio processing model.

10. The method of claim 1, wherein the source audio signal comprises human speeches.

11. A system comprising:

a non-transitory computer-readable medium; and a processor communicatively coupled to the non-transitory computer-readable medium, the processor configured to execute processor-executable instructions stored in the non-transitory computer-readable medium to:

generate a room-independent recording for a source audio signal and a particular type of microphones;

obtain a target room setup for a target room, the target room setup specifying one or more of a size of the target room, respective locations of a speaker and a microphone in the target room;

generate, via a room acoustic model, room acoustic characteristics of the target room based on the target room setup; and generate a synthetic audio signal for the target room and the particular type of microphones by applying the room acoustic characteristics onto the room-independent recording.

12. The system of claim 11, wherein generating the room-independent recording comprises obtaining a near-field recording of the source audio signal using a microphone of the particular type placed in proximity of a speaker playing the source audio signal.

13. The system of claim 11, wherein generating the room-independent recording comprises providing the source audio signal and a microphone-speaker distance to a machine learning mode, the machine learning model being trained to generate room-independent recordings for the particular type of microphones at a given distance.

14. The system of claim 11, wherein the room acoustic characteristics of the target room comprise a room impulse response (RIR), and wherein the room acoustic model comprises an improved image source model and wherein a perturbation level of noise added to each reflection of the improved image source model increases as a number of reflections increases and the RIR is adjusted using a mask reducing an amplitude of an early reverberation of the RIR and preserving a late reverberation of the RIR.

15. The system of claim 14, wherein generating the synthetic audio signal comprises convolving the room-independent recording with the room acoustic characteristics.

16. A non-transitory computer-readable medium comprising processor-executable instructions configured to cause one or more processors to:

generate a room-independent recording for a source audio signal and a particular type of microphones;

obtain a target room setup for a target room, the target room setup specifying one or more of a size of the target room, respective locations of a speaker and a microphone in the target room;

generate, via a room acoustic model, room acoustic characteristics of the target room based on the target room setup; and generate a synthetic audio signal for the target room and the particular type of microphones by applying the room acoustic characteristics onto the room-independent recording.

17. The non-transitory computer-readable medium of claim 16, wherein generating the room-independent recording comprises obtaining a near-field recording of the source audio signal using a microphone of the particular type placed in proximity of a speaker playing the source audio signal.

18. The non-transitory computer-readable medium of claim 16, wherein generating the room-independent recording comprises providing the source audio signal and a microphone-speaker distance to a machine learning mode, the machine learning model being trained to generate room-independent recordings for the particular type of microphones at a given distance.

19. The non-transitory computer-readable medium of claim 16, wherein the room acoustic characteristics of the target room comprise a room impulse response (RIR), and wherein the room acoustic model comprises an improved image source model and wherein a perturbation level of noise added to each reflection of the improved image source model increases as a number of reflections increases and the RIR is adjusted using a mask reducing an amplitude of an early reverberation of the RIR and preserving a late reverberation of the RIR.

20. The non-transitory computer-readable medium of claim 19, wherein generating the synthetic audio signal comprises convolving the room-independent recording with the room acoustic characteristics.

* * * * *